(No Model.) 3 Sheets—Sheet 1.
H. D. WEED.
CHANGEABLE SPEED MECHANISM.
No. 565,819. Patented Aug. 11, 1896.
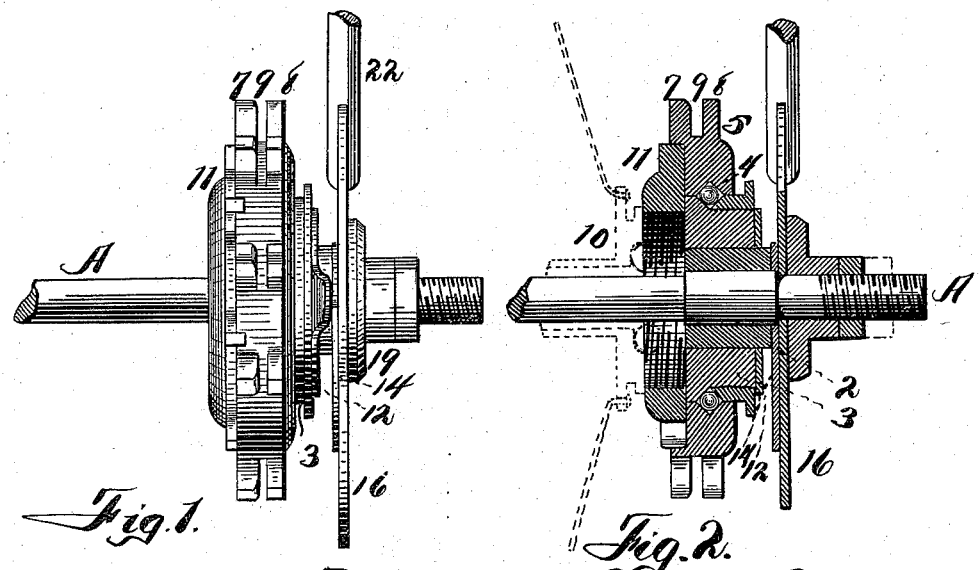
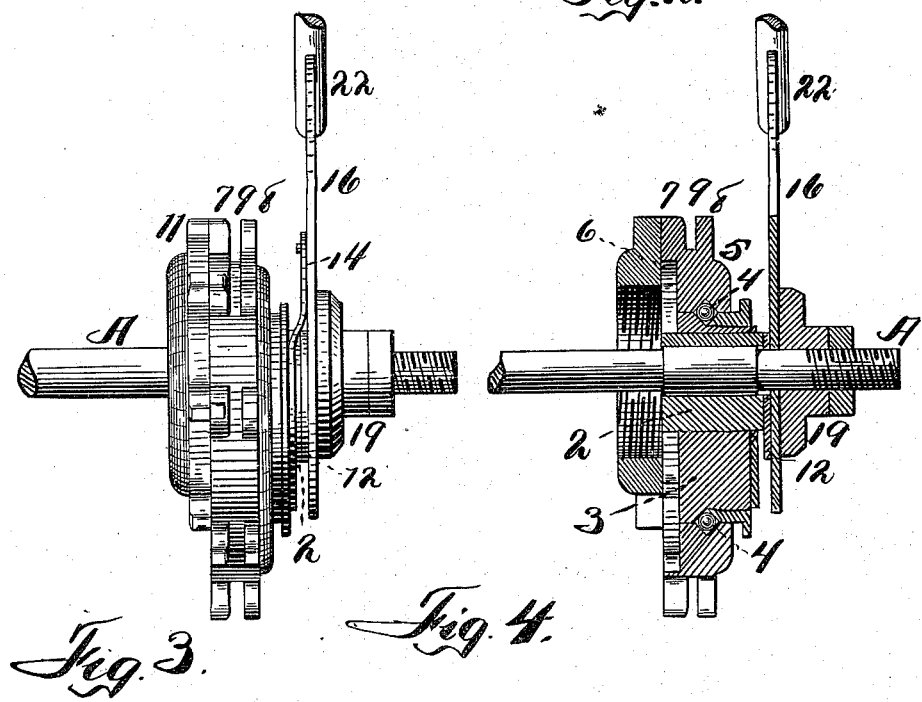
WITNESSES:
Charles. W. Marvin.
Jessie E. Murray.
INVENTOR
Harry D. Weed
BY
Smith & Benson
ATTORNEYS.

(No Model.) 3 Sheets—Sheet 2.
H. D. WEED.
CHANGEABLE SPEED MECHANISM.
No. 565,819. Patented Aug. 11, 1896.
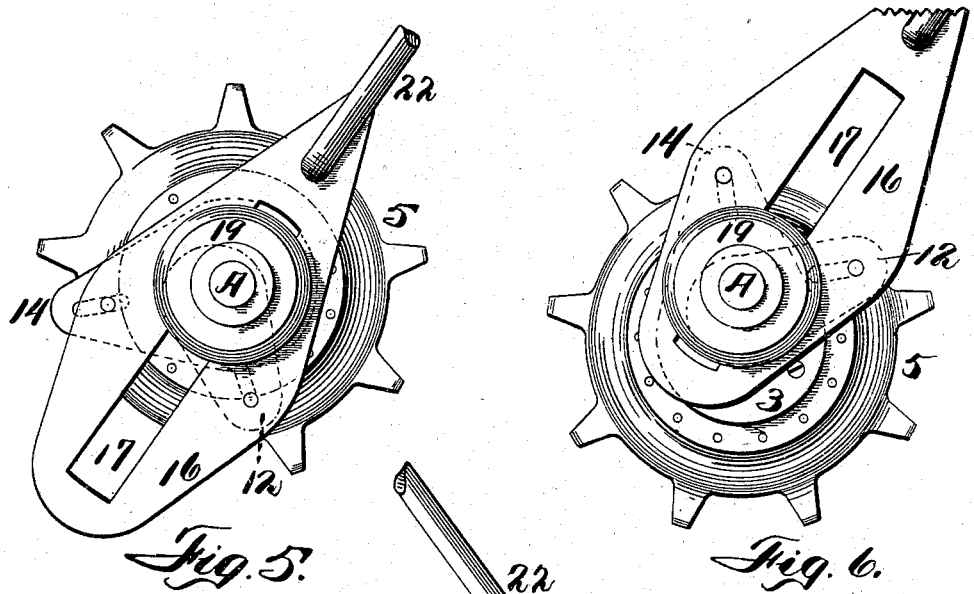
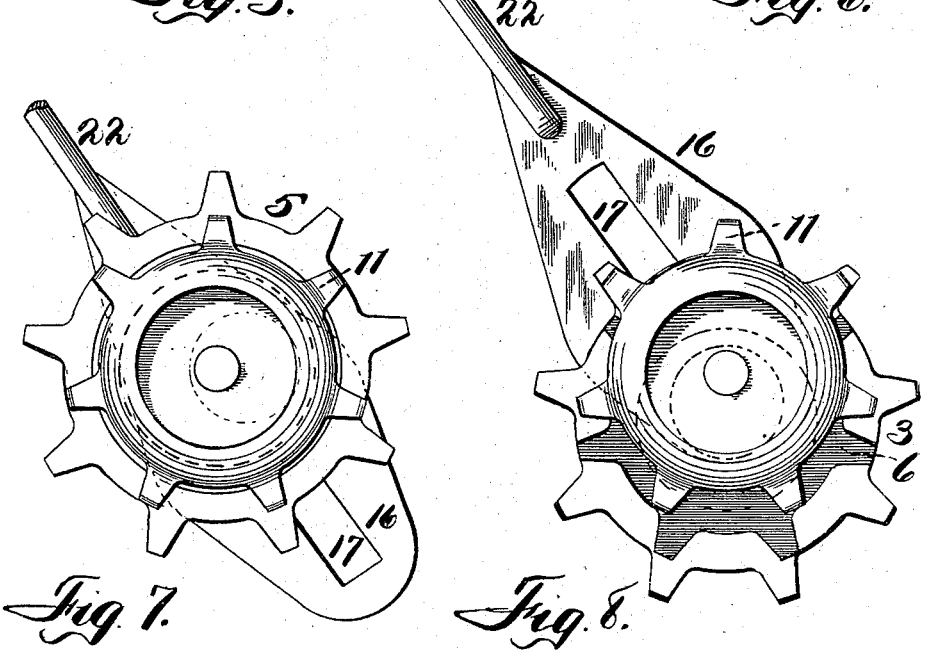
WITNESSES:
Charles W. Marvin
Jessie E. Murray
INVENTOR
Harry D. Weed
BY
Smith & Ernson
ATTORNEYS.

(No Model.) 3 Sheets—Sheet 3.
H. D. WEED.
CHANGEABLE SPEED MECHANISM.
No. 565,819. Patented Aug. 11, 1896.
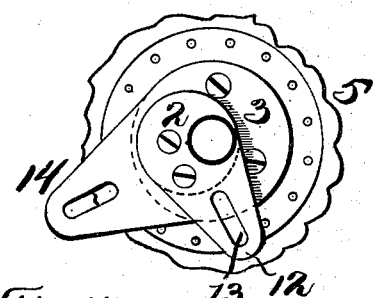
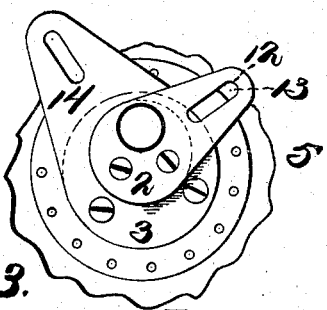
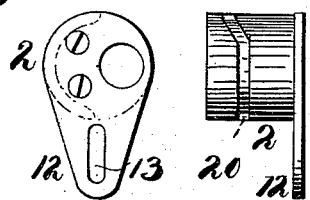
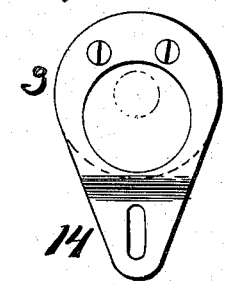
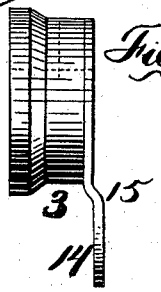
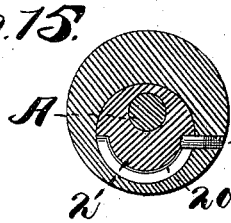
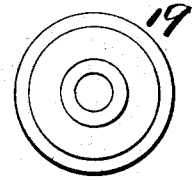
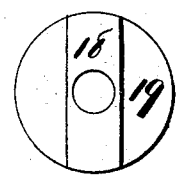
INVENTOR
Harry D. Weed.
WITNESSES:
Charles W. Morrin.
Jessie E. Murray.
BY
Smith & Kimson
ATTORNEYS.

UNITED STATES PATENT OFFICE.

HARRY D. WEED, OF SYRACUSE, NEW YORK, ASSIGNOR TO FRANCIS W. GRIDLEY, OF SAME PLACE.

CHANGEABLE-SPEED MECHANISM.

SPECIFICATION forming part of Letters Patent No. 565,819, dated August 11, 1896.

Application filed October 8, 1895. Serial No. 565,086. (No model.)

*To all whom it may concern:*

Be it known that I, HARRY D. WEED, of Syracuse, in the county of Onondaga, in the State of New York, have invented new and useful Improvements in Changeable-Speed Mechanisms, of which the following, taken in connection with the accompanying drawings, is a full, clear, and exact description.

My invention relates to chain-driven cycles, and particularly to mechanisms for changing the speed thereof from high to low speed, or vice versa, all being done by the rider without stopping the machine or removing the feet from the pedals.

My object is to produce a new changeable-speed mechanism for cycles, comprising two sprocket-wheels beside each other, both mounted upon the axle of the rear wheel or carried by it, with suitable cam or eccentric mechanisms whereby one of said sprockets can be shifted from a position concentric with the axle and the other sprocket to a position eccentric to both said axle and the other sprocket, whereby, when said sprockets are concentric with each other and with the axle, the wheel is driven at slow speed, because the driving-chain is then engaged with the larger or slow-speed sprocket. When the larger one is shifted so as to become eccentric to the smaller or high-speed sprocket, then the driving-chain is in engagement with both sprockets, but as the larger one is then loose and free to rotate the chain transmits all of its driving force to the smaller sprocket and the cycle is driven at high speed; in which the larger sprocket is provided with means whereby the chain is guided so as to be always in proper position to engage with the smaller sprocket; in which the larger sprocket consists of a ring mounted upon an eccentric and that eccentric is mounted upon an inner eccentric which is mounted loosely upon the wheel-axle, both eccentrics being eccentric to the sprocket, to each other, and to the axle, and means are provided by which said eccentrics are rotated to shift the larger sprocket; in which also the smaller sprocket is at all times concentric with said axle, and is the medium through which the driving force of the chain is transmitted to the axle to drive the wheel at slow speed when the sprockets are interlocked and at high speed when they are not, and in which a pin in the outer eccentric engages with a camway in the periphery of the inner eccentric, whereby, when said eccentrics are rotated, the outer one is shifted longitudinally to either disengage the smaller sprocket from the other one and unlock them or to permit it to reëngage therewith to lock them together, and in which both eccentrics are rotated by a lever mechanism actuated by a rod, which extends up to a convenient point for the rider, as a little in front of the saddle.

My invention consists in the several novel features of construction and operation hereinafter described, and which are specifically set forth in the claims hereunto annexed.

It is constructed as follows, reference being had to the accompanying drawings, in which—

Figure 1 is a side elevation of the changeable-speed mechanism as set at slow speed. Fig. 2 is a vertical section of the same. Fig. 3 is a side elevation of Fig. 1, set at high speed. Fig. 4 is a vertical section of Fig. 3. Fig. 5 is an elevation of the outer or right-hand face of Fig. 1, the dotted lines indicating the eccentric shifting-levers. Fig. 6 is a like view of Fig. 3. Fig. 7 is an elevation of the inner face on the left in Fig. 1. Fig. 8 is a like view of Fig. 3. Fig. 9 is an elevation showing the eccentric shifting-levers and eccentrics in the position shown in Fig. 1. Fig. 10 is a like view of Fig. 3. Fig. 11 is an elevation of the lesser eccentric and its lever, the dotted lines indicating the camway. Fig. 12 is a side elevation of Fig. 11. Fig. 13 is an elevation of the greater eccentric and its lever. Fig. 14 is a side elevation of the same. Fig. 15 is a transverse section of the two eccentrics and axle, showing the camway in one and the pin in the other. Fig. 16 is a section of the guide-plate on the axle. Fig. 17 is a front elevation thereof. Fig. 18 is a rear elevation thereof.

A is a suitable axle, upon which an eccentric 2 is rotatably mounted, hereinafter called the "inner" eccentric, and upon this another eccentric 3, hereinafter called the "outer" eccentric, is mounted rotatably, and in such relations that in one position the outer eccentric is concentric with the axle, Figs. 5, 7, and 9, and in the other one both are eccentric to the axle.

By a suitable ball-bearing joint 4 a sprocket-toothed ring 5 is rotatably mounted, having a recess 6 in its inner face, having the teeth proper, 7, partially overhanging said recess, and having a chain-guiding rib or flange 8, here shown as created by grooves 9, thus making the rib broken, for lightness, said grooves being adapted to receive the outer side bars of the chain-links and thereby guide the chain in its longitudinal alinement. This sprocket is hereinafter known as the "greater" sprocket.

In Fig. 2, 10 (in dotted lines) indicates part of the hub of a cycle-wheel, and onto it another sprocket 11 (called the "lesser" sprocket) is screwed or otherwise firmly secured, so that it is at all times concentric with the axle.

In Figs. 1, 2, and 7 this lesser sprocket is shown as seated in the recess 6 with its teeth fitting into the notches in the outer edges thereof, so that the two sprockets are connected together, the chain being only in engagement with the greater sprocket and so that the lesser sprocket is driven at the same rate of speed as the greater one, and the wheel is driven at slow speed. This recess is partly shown in Fig. 8 and is the same form as the lesser sprocket and a little larger, so as to readily receive it and its teeth, the teeth thus performing the function of a clutch to connect the two sprockets. The inner eccentric is provided with an arm or lever 12, having a slot 13, and the outer eccentric with a slotted arm or lever 14, offset, as at 15, and both levers are connected to a slide 16 by means of pins thereon, which engage with said slotways, said slide being provided with a slotway 17, which fits loosely onto a stud or other projection 18 upon a collar 19 upon the axle. The inner eccentric is provided with a camway 20, partly straight and partly angular, and 21 is a pin inserted through the outer eccentric, so that when this one is rotated the outer eccentric is reciprocated one way to the position shown in Fig. 4, by which the greater sprocket is moved out to release the lesser sprocket. At the same time the rotation of both eccentrics by the pulling up of the slide shifts the greater sprocket from its position in Fig. 7 concentric with the axle to that shown in Fig. 8 eccentric to the axle, and this brings its then upper teeth into alinement with those of the lesser sprocket, so that its teeth enter the overhanging chain and the chain then drives the greater sprocket as an idler and drives the wheel at high speed by the lesser sprocket alone. Then when the slide is operated the other way the rotation of the eccentrics retracts the outer eccentric to the position shown in Fig. 2, raises the greater sprocket into position concentric with the axle, and the lesser sprocket enters the recess in the other and locks the two sprockets together and the wheel is then driven at slow speed. A suitable rod 22 is connected to the slide, and extends up to a point convenient for the rider, as to the upper crossbar of a diamond frame in front of the saddle.

It will be seen that the speed is changed from low to high by simply shifting the low-speed or greater sprocket so that the lesser sprocket becomes the direct means for driving the wheel, and the greater sprocket becomes simply an idler, free to rotate upon the greater eccentric, and that when the change is made from a high to a low speed the lesser sprocket becomes and is made a part of the greater one, to connect it positively to the wheel, all without disengaging or disconnecting the chain from the greater sprocket, or varying its tension, the shift of the greater sprocket being made in a line vertical to the axle and at a right angle to the line of the crank-shaft.

Having described my invention, what I claim, and desire to secure by Letters Patent, is—

1. The combination with a wheel and an axle upon which it revolves, of a lesser sprocket secured to the hub and always concentric with said axle, and a greater sprocket detachably connected to said lesser sprocket and in one position concentric therewith, and means to shift said greater sprocket into a position detached from and eccentric to said lesser sprocket whereby the power is applied directly to the latter to drive the wheel.

2. The combination with a wheel and an axle upon which it revolves, of two sprockets of unequal size detachably connected together, and means to disconnect them and shift the greater sprocket eccentrically to bring part of its teeth into alinement with those of the lesser sprocket which is secured to said wheel.

3. The combination with a wheel, of a lesser sprocket secured to its hub, a greater sprocket detachably connected to the lesser sprocket, and an eccentric rotatably mounted and upon which the greater sprocket is rotatably mounted and means to rotate said eccentric to bring the teeth of said sprockets into or out of alinement to engage doubly or singly with a chain.

4. The combination with a wheel, of a lesser sprocket secured to its hub, a greater sprocket detachably connected to the lesser sprocket, an axle, an inner eccentric secured thereon, a greater eccentric mounted upon said inner eccentric, said greater sprocket being rotatably mounted upon said outer eccentric and means to rotate said eccentrics, simultaneously to shift the greater sprocket to bring the teeth of the lesser sprocket into engagement with a sprocket-chain, or to disengage it from the teeth of the lesser sprocket.

5. The combination with two eccentrics one within the other and eccentric to each other, of two sprockets of unequal size, the greater sprocket being mounted upon the greater eccentric, and the lesser sprocket being mounted upon a shaft and adapted to engage with the other when said sprockets are concentric, and to become disengaged from it when the greater eccentric is shifted by said eccentrics into a position eccentric to the lesser sprocket, whereby said shaft is driven at different speeds.

In witness whereof I have hereunto set my hand on this 26th day of September, 1895.

HARRY D. WEED.

Witnesses:
JESSIE E. MURRAY,
HOWARD P. DENISON.